United States Patent
Elking et al.

(10) Patent No.: US 9,403,589 B2
(45) Date of Patent: Aug. 2, 2016

(54) MANUAL OVERRIDE FOR STEERING ACTUATOR

(71) Applicants: Ryan M. Elking, Miamisburg, OH (US); Gerard S. Edwards, Centerville, OH (US); Daniel L. Kottmyer, Springfield, OH (US)

(72) Inventors: Ryan M. Elking, Miamisburg, OH (US); Gerard S. Edwards, Centerville, OH (US); Daniel L. Kottmyer, Springfield, OH (US)

(73) Assignee: Globe Motors, Inc., Dayton, OH (US)

( * ) Notice: Subject to any disclaimer, the term of this patent is extended or adjusted under 35 U.S.C. 154(b) by 383 days.

(21) Appl. No.: 14/085,872

(22) Filed: Nov. 21, 2013

(65) Prior Publication Data

US 2015/0135873 A1    May 21, 2015

(51) Int. Cl.
| | |
|---|---|
| *B63H 25/52* | (2006.01) |
| *F16H 3/22* | (2006.01) |
| *F16H 1/00* | (2006.01) |
| *F16H 1/06* | (2006.01) |
| *F16H 3/00* | (2006.01) |
| *B63H 25/26* | (2006.01) |
| *B63H 25/34* | (2006.01) |
| *B63H 5/125* | (2006.01) |
| *B63H 21/22* | (2006.01) |

(52) U.S. Cl.
CPC ............. *B63H 25/52* (2013.01); *B63H 5/125* (2013.01); *B63H 21/22* (2013.01); *B63H 25/26* (2013.01); *B63H 25/34* (2013.01); *F16H 1/003* (2013.01); *F16H 1/06* (2013.01); *F16H 3/002* (2013.01); *F16H 3/22* (2013.01); *B63H 2005/1254* (2013.01); *Y10T 74/19614* (2015.01)

(58) Field of Classification Search
CPC .... B63H 21/26; B63H 2021/17; B63H 20/17; F16H 1/06; F16H 3/002; F16H 3/22; F16D 11/14

USPC ....... 74/665 R, 670, 625, 355, 392, 397, 721, 74/665 F, 665 G, 665 GA, 665 Q, 826, 74/388 R, 388 PS; 192/34, 20; 440/61 S, 440/61 C; 180/6.24, 6.26, 6.32, 6.38

See application file for complete search history.

(56) References Cited

U.S. PATENT DOCUMENTS

| | | | | |
|---|---|---|---|---|
| 3,930,422 | A | * | 1/1976 | Morimatsu ............. F16D 15/00 192/95 |
| 4,838,818 | A | | 6/1989 | Edwards |
| 5,253,604 | A | | 10/1993 | Bohlin |
| 5,755,059 | A | * | 5/1998 | Schap ........................ B60J 5/06 49/360 |
| 6,431,928 | B1 | | 8/2002 | Aarnivuo |
| 7,186,157 | B2 | | 3/2007 | Mansson et al. |
| 7,367,854 | B2 | | 5/2008 | Arvidsson |
| 7,412,906 | B2 | * | 8/2008 | Ponziani ............. B62D 5/0406 180/443 |
| 7,438,615 | B2 | | 10/2008 | Arvidsson |
| 7,840,318 | B2 | | 11/2010 | Bremsjö |
| 2010/0078980 | A1 | * | 4/2010 | Popa .................... B60N 2/0296 297/284.7 |

* cited by examiner

*Primary Examiner* — William Kelleher
*Assistant Examiner* — Bobby Rushing, Jr.
(74) *Attorney, Agent, or Firm* — Stevens & Showalter LLP (57) ABSTRACT

A steering actuator including a motor having a rotor including opposing input and output ends. A driven gear is supported on the input end of the rotor shaft for rotation with the rotor shaft and the output end provides a rotational output of the steering actuator. An override shaft is supported for rotation parallel to the rotor and a drive gear is supported for rotation with the override shaft wherein the drive gear is longitudinally movable relative to the driven gear to engage and disengage the drive gear relative to the driven gear. A coupling structure is provided on an end of the override shaft for detachable engagement with an auxiliary driver. The auxiliary driver provides a rotational driving force to the override shaft for effecting rotation of the rotor shaft.

22 Claims, 7 Drawing Sheets

FIG. 6D

MANUAL OVERRIDE FOR STEERING ACTUATOR

FIELD OF THE INVENTION

The invention relates to a motor energized steering actuator and, more particularly, to an override drive for operating a steering actuator in the event of failure of a motor for energizing the steering actuator.

BACKGROUND OF THE INVENTION

A steering actuator may be provided for controlling the direction of a vehicle, where the actuator is operated in controlled movement in response to operator inputs from a remote location. For example, in a directional control system for a marine vessel, an operator may provide inputs to wheel at a control location on the vessel for turning a propulsor unit on a powered outboard drive (POD) to predetermined positions based on the inputs. In vessels where the distance between the wheel and the propulsor unit is such that a direct connection via cables cannot be conveniently provided for setting the direction of the propulsor unit, an electric motor drive may be implemented for turning the propulsor unit. In particular, the POD may comprise an underwater housing projecting downwards from the outside of a hull, and suspended from a base structure of the POD for rotation about an essentially vertical axis. Rotation of the underwater housing may be actuated by a servomotor via a gear rim connected to the underwater housing in a manner such as is described in U.S. Pat. No. 7,186,157, which patent is incorporated herein by reference in its entirety.

SUMMARY OF THE INVENTION

In accordance with an aspect of the invention, a steering actuator is provided including a housing and a motor located within the housing. The motor includes a stator and a rotor rotatably supported within the stator. The steering actuator further comprises a rotor shaft supporting the rotor and including opposing input and output ends extending from respective ends of the stator. The rotor shaft is supported for rotation about a rotor axis defining a longitudinal direction of the steering actuator, and a driven gear is supported on the input end of the rotor shaft for rotation with the rotor shaft. An override structure is supported for rotation within the housing, the override structure including an override shaft and a drive gear. The drive gear is supported for rotation with the override shaft wherein the drive gear is longitudinally movable relative to the driven gear to engage and disengage the drive gear relative to the driven gear. A coupling structure is provided on an end of the override structure for engagement with an auxiliary driver located outside of the housing. The housing includes a hole for receiving a portion of the auxiliary driver therethrough for providing a rotational driving force to the override structure and effecting rotation of the rotor shaft.

The override structure may effect rotation of the rotor shaft in the absence of an electromotive force within the motor.

The output end of the rotor shaft may include an output gear engaged with a gearbox providing an output of the steering actuator, wherein the output of the steering actuator may include an output shaft of the gearbox that is rotatable a selected rotational amount. The output shaft of the gearbox may be operably coupled to a powered outboard drive of a marine vessel for controlling the direction of a propulsor of the powered outboard drive.

The drive gear may be movable relative to the housing in the longitudinal direction to engage the driven gear.

The housing may include a cover including the hole for receiving the portion of an auxiliary driver, and the hole may receive an end of the override shaft.

The override shaft may be laterally displaced from and extend parallel to the rotor shaft.

The drive gear may be movable within a first, locked range of longitudinal movement and a second, unlocked range of longitudinal movement; within the first, locked range of longitudinal movement, a rotational driving force from the auxiliary driver may be resisted to prevent rotation of the override structure; and within the second, unlocked range of longitudinal movement, the override structure may be rotatable in response to a rotational driving force from the auxiliary driver.

The steering actuator may further include a locking structure having a stationary component and a rotatable component, the stationary component supported in stationary relation to the housing and defining one or more notches adjacent to the override shaft and facing longitudinally toward the drive gear, and the rotatable component comprising a tine structure affixed on the override structure for engagement with the one or more notches. The first, locked range of longitudinal movement may be defined during an engagement between the tine structure and the one or more notches, and the second, unlocked range of longitudinal movement may be defined by the tine structure being longitudinally spaced from the one or more notches. The drive gear may be disengaged from the driven gear throughout at least a portion of the first, locked range of movement, and the drive gear may be engaged with the driven gear throughout the second, unlocked range of movement. The drive gear may be engaged with the driven gear during at least a portion of the first, locked range of movement.

A resilient biasing member may be provided for effecting longitudinal movement of the drive gear toward a longitudinal position that is disengaged from the driven gear.

At least part of the override structure may be movable in the longitudinal direction to engage the drive gear with the driven gear in response to a force applied in the longitudinal direction to the coupling structure on the end of the override structure.

In accordance with another aspect of the invention, a steering actuator is provided including a housing and a motor located within the housing. The motor includes a stator and a rotor rotatably supported within the stator. The steering actuator further comprises a rotor shaft supporting the rotor and including opposing input and output ends extending from respective ends of the stator. The rotor shaft is supported for rotation about a rotor axis defining a longitudinal direction of the steering actuator, and a driven gear is supported on the input end of the rotor shaft for rotation with the rotor shaft. An override structure is supported for rotation within the housing, the override structure including an override shaft and a drive gear. The drive gear is supported for rotation with the override shaft wherein the drive gear is longitudinally movable relative to the driven gear to engage and disengage the drive gear relative to the driven gear. A coupling structure is provided on an end of the override structure for engagement with an auxiliary driver located outside of the housing for providing a rotational driving force to the override structure and effecting rotation of the rotor shaft. A boss extends from an interior surface of the housing and surrounds the override shaft, and the boss has a castellated end distal from the interior surface and defines notches. A tine structure extends radially from the override shaft and is longitudinally positioned for engagement with one or more of the notches in the castellated end. The override shaft is supported to the housing for movement in the longitudinal direction to position the tine structure in engagement with and in disengagement from the one or more notches.

A resilient biasing member may be provided for effecting movement of the override shaft to engage the tine structure in the one or more notches.

The castellated end of the boss may include prongs defining the notches therebetween, and distal ends of the prongs may include edges angled inward in the longitudinal direction into the notches.

A longitudinal position of the tine structure in disengagement from the one or more notches may correspond to a longitudinal position of the drive gear engaged with the driven gear.

A longitudinal position of the tine structure in engagement with the one or more notches may correspond to a longitudinal position of the drive gear disengaged from the driven gear.

A longitudinal transitional position of the tine structure may be provided wherein the tine structure is in engagement with the one or more notches and the drive gear is engaged with the driven gear.

The override structure may be movable in the longitudinal direction to engage the drive gear with the driven gear in response to a force applied in the longitudinal direction to the coupling structure on the end of the override structure.

The housing may include a housing cover defining the interior surface, and the boss may be supported on the housing cover.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

In accordance with an aspect of the invention, it has been recognized that in the event of a failure of a motor energized steering actuator, there is a need to provide a motive force to the steering actuator in order to redirect one or more components of the actuator to a desired position. In accordance with a further aspect of the invention, an override structure is provided to enable an auxiliary drive to temporarily energize the steering actuator independently of energization of the motor for the actuator.

Figure 1:
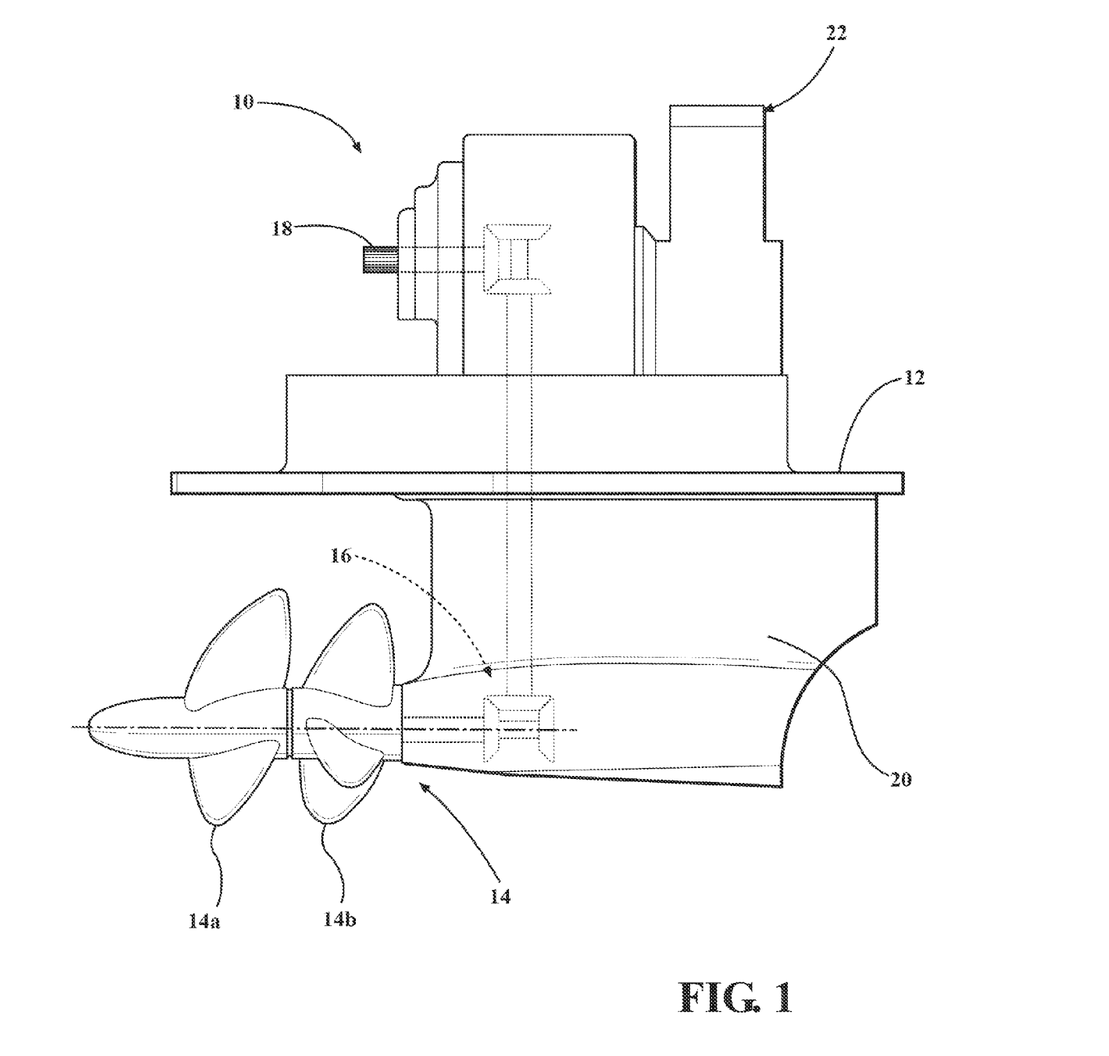
FIG. 1 is a diagrammatic side view of a portion of a boat hull generally illustrating a powered outboard drive with a power steering actuator.

Referring to FIG. 1, the present invention may be implemented in a powered outboard drive (POD) 10 rigidly supported to the hull 12 of a marine vessel, although it should be understood that, unless otherwise limited by the claims, the present invention may additionally be implemented in other steering applications. In the particular illustrated embodiment, the POD 10 includes a propulsor unit 14 configured with a pair of propellers 14a, 14b driven by a drive train 16 receiving power via an input shaft 18, such as may be supplied by an internal combustion engine (not shown). The propulsor unit 14 comprises an underwater housing 20 extending below the bottom of the hull 12 for supporting a lower portion of the drive train 16 with the propellers 14a, 14b. The underwater housing 20 is supported for rotation relative to the hull 12 to provide steering direction to the vessel, as is known in the art and as described in the above-referenced U.S. Pat. No. 7,186,157. A POD steering actuator (PSA) or steering actuator 22 is mounted to the POD 10 for providing a rotational drive to the underwater housing 20 in order to position the propellers 14a, 14b in a selected angular orientation relative to the hull 12 and thereby providing directional control to the vessel.

It should be understood that in the following description of the invention, terms such as "upper," "lower," "upward," "downward," and "elevated" are used, and it should be understood that these terms and similar terms are used to described relative locations or positions of the elements of the present steering actuator with reference to the illustrations of the invention provided herein, and that the present steering actuator could be utilized in other orientations than is presently illustrated.

Figure 2:
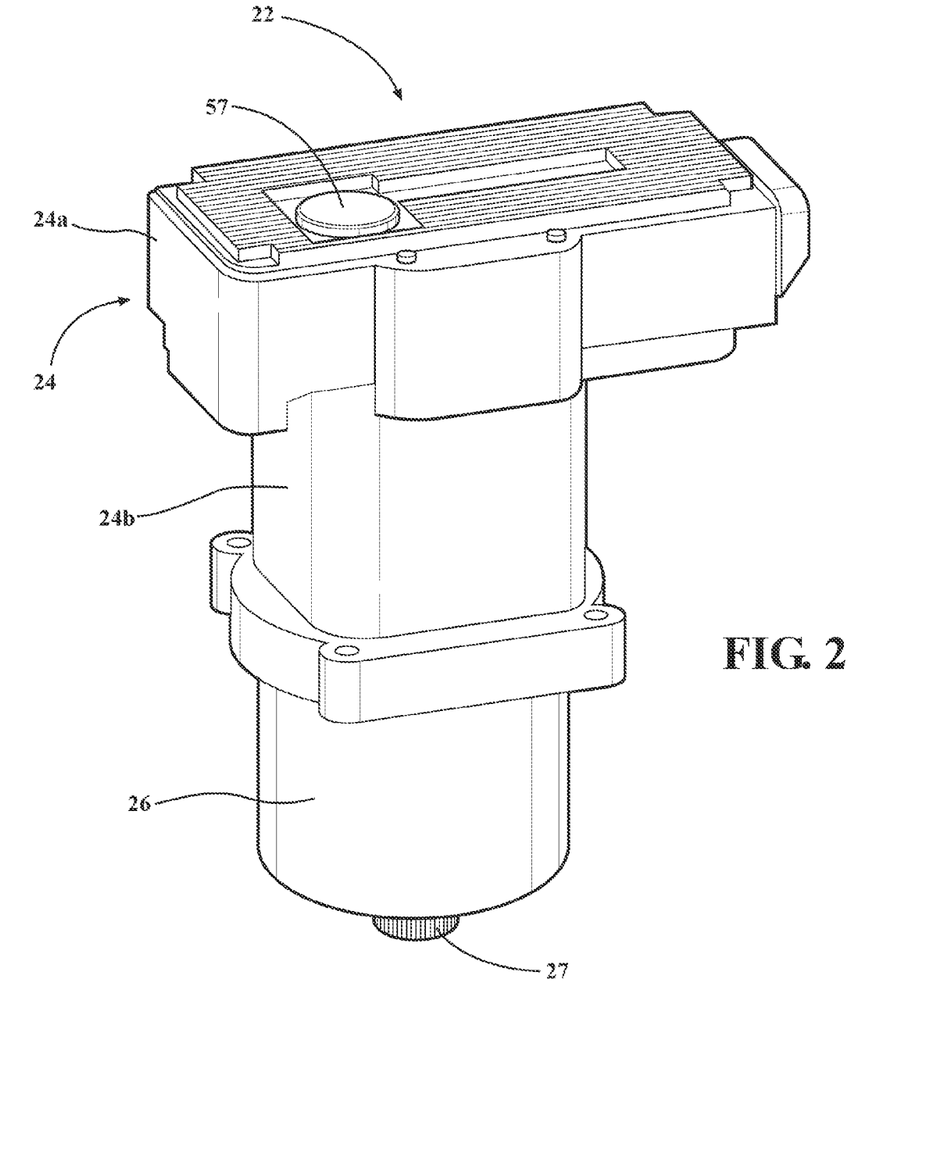
FIG. 2 is a perspective view of a power steering actuator in accordance with aspects of the invention.

Referring to FIG. 2, the steering actuator 22 in accordance with aspects of the present invention includes a housing 24, comprising an upper controller housing 24a and a lower motor housing 24b, and a gearbox 26 mounted to a lower end of the motor housing 24b. The gearbox 26 may include an output shaft and/or gear 27 at the lower end of the gearbox 26 engaged with a gear (not shown), or other structure, of the POD 10 connected to the underwater housing 20 whereby a rotational driving force can be provided from the steering actuator 22 to the underwater housing 20. Alternatively, any intermediate transmission structure may be provided to form an operable association between the steering actuator 22 and the POD. The output shaft and/or gear 27 can be rotatable a selected rotational amount, e.g., a predetermined number of rotations, to rotate the underwater housing 20 to a selected angular orientation.

Figure 3:
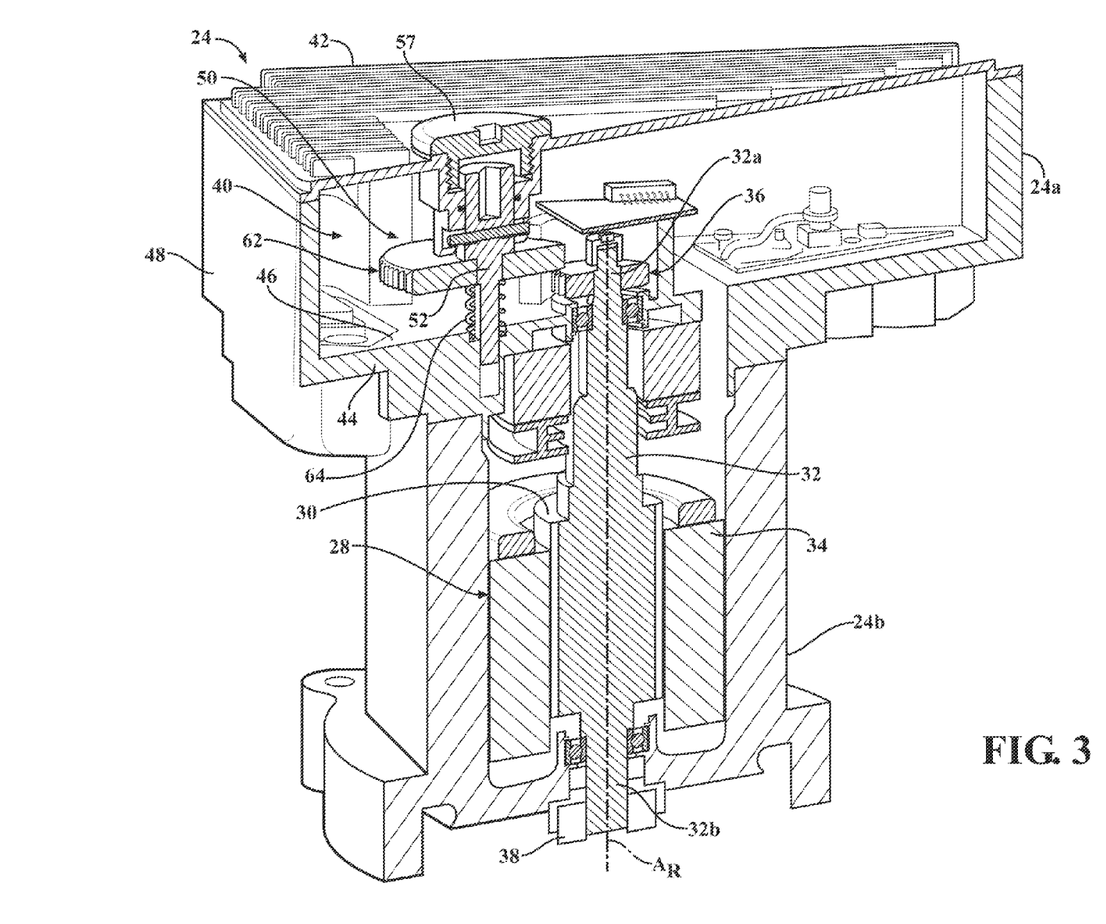
FIG. 3 is a cross-sectional perspective view of the power steering actuator of FIG. 2.

Referring further to FIG. 3, the motor housing 24b includes a motor 28 for energizing the steering actuator 22. In the illustrated embodiment, the motor 28 is an electric motor, such as a brushless DC motor, having a rotor 30 supported on a rotor shaft 32, and a stator 34 surrounding the rotor 30 and having field windings energized to generate an electromotive force within the motor 28 for rotating the rotor shaft 32. In the particular configuration illustrated herein, a rotary position assembly 31 is located over an upper end of the rotor shaft 32 and includes a sense magnet assembly 33 positioned on the end of the rotor shaft 32 and a printed circuit board assembly 35, including a sensor component (not shown) for sensing the sense magnet assembly 33, positioned over the end of the rotor shaft 32. It should be understood that, within the spirit and scope of the invention, the motor 28 is not limited to the particular configuration described herein. For example, the rotor 30 may be configured to with windings energized to generate an electromotive force between the rotor and the stator, such as in a brush motor, or the motor 28 may comprise any other configuration of motor to produce an output at the rotor shaft 32.

The rotor shaft 32 rotates about a rotor axis $A_R$ defining a longitudinal direction for the steering actuator 22. The rotor shaft 32 includes an upper, input end 32a supporting a driven gear 36 for rotation with the rotor shaft 32, and includes a lower, output end 32b supporting an output gear 38 for engagement with a gear train (not shown) in the gearbox housing 24b to provide a rotational input to reduction gears within the gearbox housing 24b. It may be understood that the present invention is not limited to the particular described output structure, and that the output end 32b of the rotor shaft 32 may be coupled in any manner to provide an output to associated structure.

Figure 4:
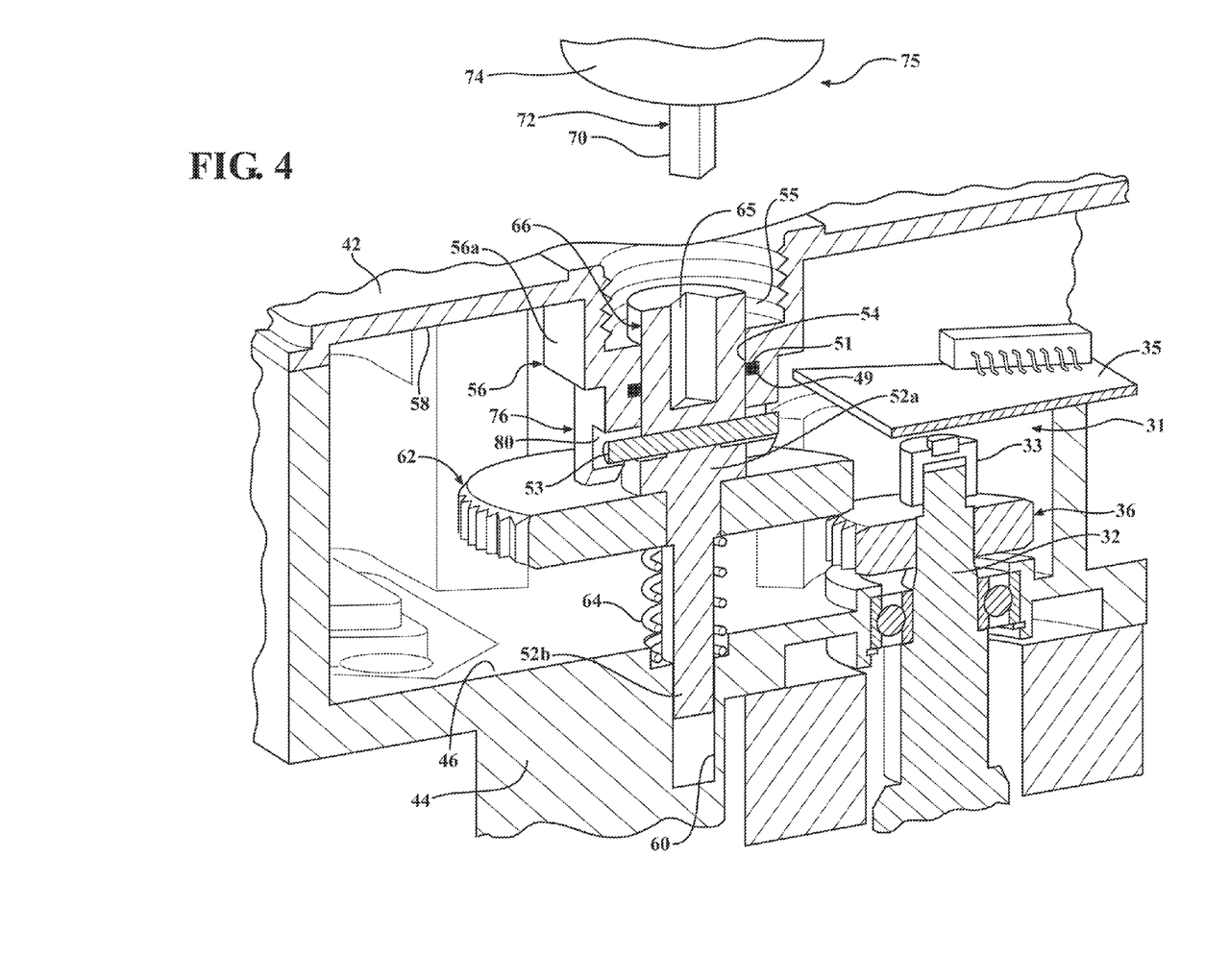
FIG. 4 is an enlarged view of a portion of the view of FIG. 3 and illustrating an auxiliary drive unit.

Referring to FIGS. 3 and 4, the controller housing 24a includes a peripheral controller wall 48 defining a controller cavity 40, and includes a housing cover 42 fastened to the controller wall 48 for closing an open upper end of the cavity 40. A lower platform or base 44 includes an upwardly facing lower interior surface 46 defining a lower end of the cavity 40, and the peripheral controller wall 48 extends perpendicular to the base 44 and includes an upper end defining an attachment location for the housing cover 42.

In accordance with an aspect of the invention, an override structure 50 is located within the controller cavity 40, and comprises a manual override feature that permits an operator to provide an input rotational force to the rotor shaft 32 apart from a rotational force produced by the motor 28, such as apart from an electromotive force provided via either the stator 28 or the rotor 30. The override structure 50 includes an override shaft 52 and a drive gear 62 supported on the override shaft 52. Additionally, a pin 53 extends transversely through the override shaft 52, just above the drive gear 62. The override shaft 52 is supported for rotation within the controller cavity 40 of the housing 24 parallel to and laterally spaced from the rotor shaft 32.

In the embodiment illustrated in FIGS. 3 and 4, the override shaft 52 may comprise a unitary shaft defining an upper shaft portion 52a and a lower shaft portion 52b. In an alternative configuration, the upper shaft portion 52a could be formed a separate member from the lower shaft portion 52b and the upper and lower shaft portions 52a, 52b may be engaged in telescoping relation, such as in a press fit, and the pin 53 may be positioned extending through the upper and lower shaft portions 52a, 52b to positively affix the two shaft portions 52a, 52b together. The drive gear 62 is supported for rotation with the override shaft, it may be understood that the drive gear 62 may be formed integral with or separate from the override shaft 52. In the case of being formed integral with the override shaft 52, this may be best accomplished by forming the two shaft portion 52a, 52b separately, and forming the drive gear 62 and upper shaft portion 52a as a single component (see FIG. 7).

As seen in FIG. 4, an upper end of the override shaft 52, as may be defined by the upper shaft portion 52a, is received in an upper hole or bore 54 defined within a boss 56 that extends into the controller cavity 40 from an upper interior surface 58 of the housing 24 defined on the housing cover 42. The boss 56 may be a feature formed integrally with the housing cover 42 surrounding the end of the upper shaft portion 52a. An upper portion 56a of the boss 56 defines a larger diameter upper area of the upper bore 54, forming an access well 55 for receiving a plug 57 (FIG. 3) forming a removable cover for accessing the override shaft 52. The access well 55 and plug 57 may include threads, permitting the plug 57 to be rotated in threaded engagement or disengagement with the access well 55. It may be understood that other configurations for covering the access well 55 may be provided including, without limitation, a non-threaded plug or cover positioned in or over the access well 55.

It should be noted that an O-ring 51 can be located in a circumferential slot 49 of the boss 56 at the upper bore 54 for engaging against the upper shaft portion 52a. The O-ring forms a seal with the upper shaft portion 52a to prevent contaminants from entering the controller cavity 40, such as when the plug 57 is removed, as well as functioning to center the override shaft 52 within the upper bore 54. It may be understood that other configurations for sealing the upper shaft portion 52a with the upper bore 54 can be implemented including, but not limited to, providing the O-ring 51 in a slot or groove (not shown) formed in the outer diameter surface of the override shaft 52 for engagement of the O-ring 51 against the surface of the bore 54.

The lower shaft portion 52b is received in a lower bore 60 that is formed into the base 44 of the controller housing 24a. The drive gear 62 is supported for rotation with the override shaft 52, and the override shaft 52 is movable longitudinally to locate the drive gear 62 within a range of longitudinal positions within the controller cavity 40. A resilient biasing member, illustrated herein as a spring 64, is provided for biasing the drive gear 62 in the longitudinal direction toward the housing cover 42. In particular, the spring 64 comprises a coil spring 64 surrounding the lower shaft portion 52a, and acting between the lower interior surface 46 and a downward facing side of the drive gear 64 to bias the drive gear 64 away from the lower interior surface 46. Alternatively, the upper end of the spring 64 could be biased against any other structure provided to the override shaft 52. It may be understood that the upper and lower bores 54, 60 are formed with a sufficient longitudinal depth to accommodate the range of movement of the override shaft 52, and that the override shaft 52 is of sufficient length to remain in engagement within the bores 54, 60 throughout its range of movement.

It may be understood that the upper and lower bores 54, 60 could be provided with a lubricant such as grease to minimize or reduce friction between the bores 54, 60 and the override shaft 52 during rotational and longitudinal movement of the override shaft 52. Alternatively or in addition, the upper and lower bores 54, 60 could be provided with bearings or bearing material (not shown) to provide a low friction interface with the override shaft 52.

Figure 6A:
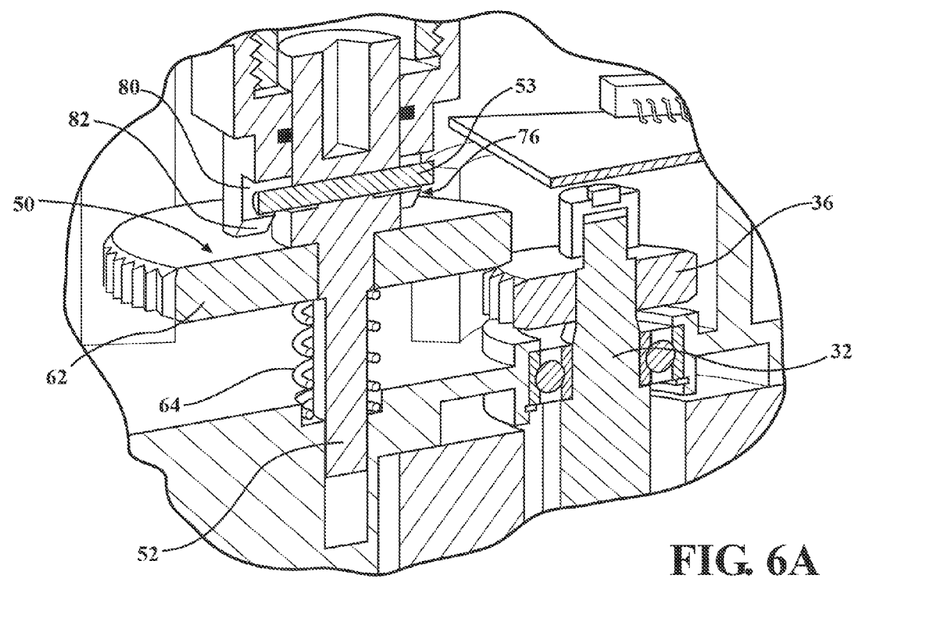
FIGS. 6A-D are cross-sectional perspective views illustrating different operable positions for an override structure in accordance with an aspect of the invention.

The driven gear 36 is a component of the override structure 50, and the drive gear 62 is laterally positioned such that the teeth of the drive gear 62 and the driven gear 36 engage with each other when the drive gear 62 is moved longitudinally to a lower position within the housing cavity 40, i.e., closer to the lower interior surface 46. The range of longitudinal movement of the drive gear 62, with corresponding movement of the override shaft 52, is such that the spring 64 normally biases and maintains the drive gear 62 in an elevated position out of engagement with the driven gear 36. That is, in the absence of a force directed longitudinally against the override shaft 52, the drive gear 62 will remain in the disengaged position illustrated in FIGS. 3, 4 and 6A.

In accordance with another aspect of the invention, the upper shaft portion 52a is formed as a coupling structure 66 including a shaft drive feature for engaging a drive shaft of corresponding shape in overlapping or telescoping relation. Referring to FIG. 4, the upper shaft portion 52a may be formed with a shaft drive feature extending to the upper hole or bore portion defined by the access well 55, and the shaft drive feature may be in the form of a non-circular opening, such as a square opening 65, for receiving an auxiliary drive unit 75 comprising a similarly shaped end 70 of a drive shaft 72. The auxiliary drive unit 75 further comprises a powered unit 74, which may comprise, for example, an electric drill for driving the drive shaft 72 in rotating movement. Alternatively, the auxiliary drive unit 75 may comprise a shaft 72 that can be manually driven in rotation, such as by a manually operated wrench, or any other auxiliary means for engaging and rotating the override shaft 52. It may be understood that the auxiliary drive unit 75 may be used to exert a force longitudinally inward on the coupling structure 66 to move the override shaft 52 and associated drive gear 62 downward against the biasing force of the spring 64 in order to engage the drive gear 62 with the driven gear 36, as is discussed further below.

Figure 5:
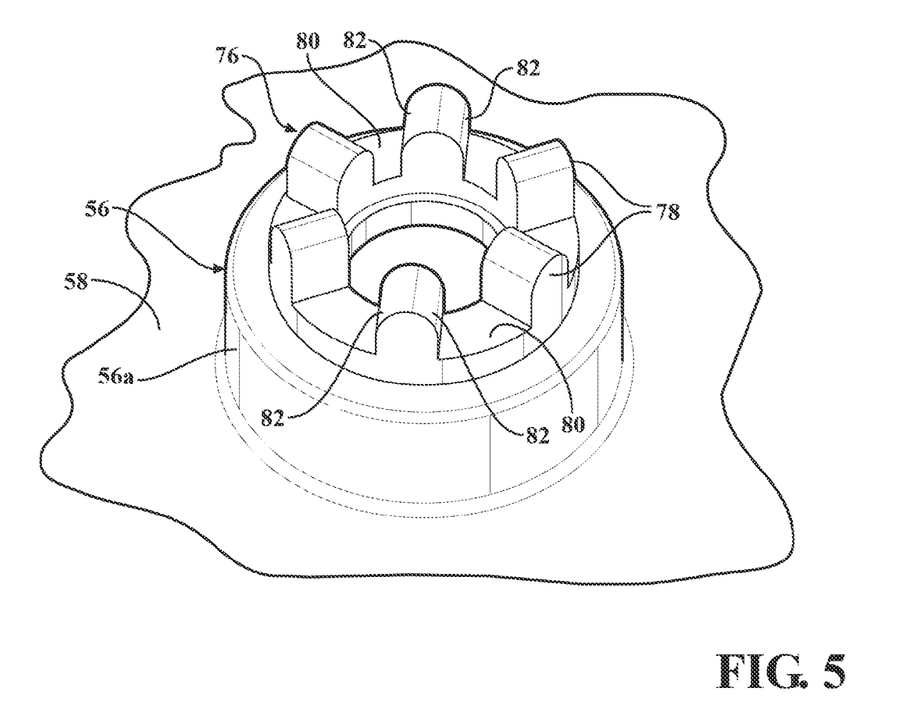
FIG. 5 is a perspective view of an interior surface of a housing cover, including a castellated boss feature in accordance with an aspect of the invention.

In accordance with a further aspect of the invention, a lower end of the boss 56 defines a castellated end 76 distal from an upper interior surface 58 defined by the housing cover 42, as seen in FIGS. 4 and 5. The castellated end 76 of the boss 56 includes prongs 78 extending longitudinally and defining notches 80 therebetween, and distal ends of the prongs 78 including edges 82 angled inward in the longitudinal direction into the notches 80. The inward angle defined by the edges 82 may comprised either generally planar surfaces that are angled inward, or may comprise a generally rounded surface defining a varying inward angle for the edges 82. It should be understood that references herein to the edges 82 being "angled inward" encompass configurations of the edges 82 that may be planar, rounded, or any similar inwardly contoured edge, including combinations of planar and rounded surfaces to define ramp-type surfaces inclined into the notches 80.

Referring to FIG. 4, ends of the pin 53 extend radially outward from diametrically opposed sides of the override shaft 52 and define a tine structure that is rotationally and longitudinally positioned for engagement with one or more of the notches 80 in the castellated end 76. In particular, in the longitudinally upwardly biased position of the override shaft 52, the tine structure (hereinafter referred to as "pin 53") can be engaged with a pair of notches 80 located on opposing sides of the castellated end 76 to prevent rotation of the override shaft 52 relative to the boss 56. Hence, the drive gear 62 is prevented from rotating during a range of longitudinal movement of the override shaft 52 during which the pin 53 is engaged within the notches 80. It should be noted that, in an alternative configuration, the tine structure could comprise a pin that extends from only one side of the override shaft 52 to engage with a single notch 80.

The length of the notches 80 in the longitudinal direction is preferably long enough that the pin 53 is capable of traveling a distance into the notches 80 after an initial engagement between the pin 53 and the notches 80. The travel of the pin 53 within the notches 80 is sufficient to permit the pin 53 to initially engage the notches 80 while the drive gear 62 is at least partially engaged with the driven gear 36 and to permit further upward longitudinal movement of the override shaft 52 until the drive gear 62 is fully disengaged from the driven gear 36.

It may be noted that the angled edges 82 of the notches 80 facilitate engagement of the pin 53 within the notches 80. In particular, the angled edges 82 define a widened entry to the notches 80 that facilitates rotational alignment of the pin 53 with the notches 80, even if the angular orientation of the override shaft 52 slightly misaligns the pin 53 relative to the notches 80, to guide the pin 53 into the notches 80. In this regard, it may be understood that the number and width of the prongs 78, and the corresponding number of notches 80, is selected to minimize the possibility that the pin 53 will be impeded from engaging within the notches 80 as a result of the pin 53 resting on any flat surface area at the ends of the prongs 78 as the override shaft 52 is biased upward. That is, the placement and configuration of the prongs 78 facilitates guiding and positioning the pin 53 into the notches 80 as the pin 53 is biased into the castellated end 76 by the spring 64.

Referring to FIGS. 6A, 6B, 6C and 6D, the range of movement of the drive gear 62 is shown extending between locked and unlocked positions. As discussed above, FIG. 6A illustrates the override shaft 52 in a fully upwardly biased position in which the pin 53 is engaged toward an upper end of the notches 80 to define a locked state for the override shaft 52, and in which there is a clearance between the drive gear 62 and the driven gear 36.

Figure 6B:
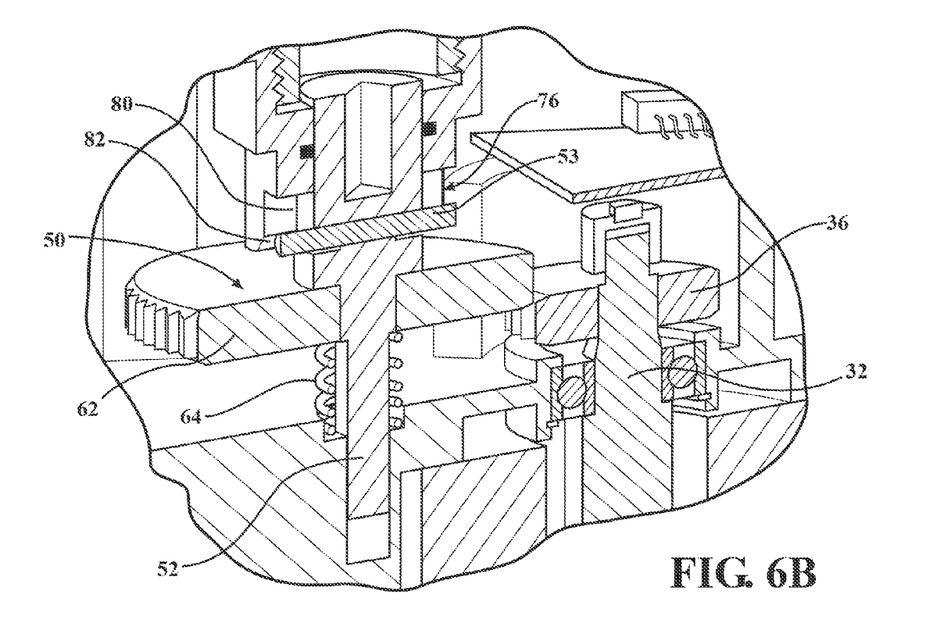

FIG. 6B illustrates the override shaft 52 in a partially depressed, intermediate position in which the pin 53 is still engaged within the notches 80 to lock the override shaft 52 from rotation, and in which the drive gear 62 is at least partially overlapping or engaged with the driven gear 36. The range of longitudinal movement of the pin 53 within the notches, such as between the positions shown in FIGS. 6A and 6B, defines a range of locked movement for resisting rotational movement of the override shaft 52 in the event that a driving force is applied from the auxiliary drive unit 75. In the position of FIG. 6B, the engagement of the pin 53 within the notches 80 ensures that the drive gear 62 cannot be driven when the teeth of the drive and driven gears 62, 36 are not sufficiently engaged to prevent slipping of the edges of the gear teeth past each other. In accordance with an aspect of the invention, the teeth of the drive gear 62 must be engaged a predetermined amount with the teeth of the driven gear 36, to thereby avoid slipping engagement between edges of the gear teeth prior to establishment of a predetermined engagement. Slipping engagement between the teeth of the gears 36, 62 could result in chipping of the edges of the teeth with resultant debris in the controller cavity 40.

Figure 6C:
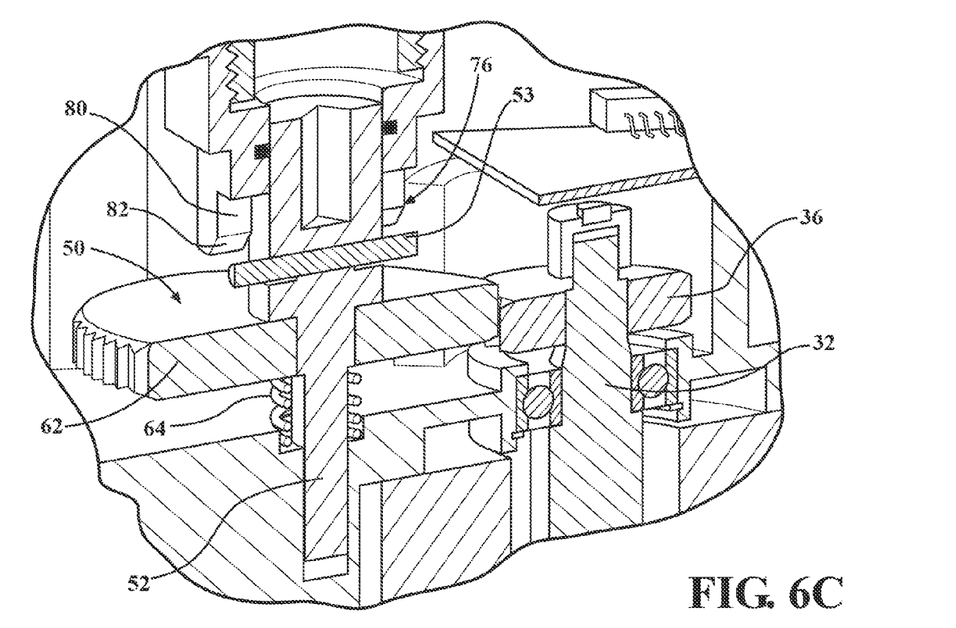

FIG. 6C illustrates the override shaft 52 in a partially depressed position in which the pin 53 is disengaged from within the notches 80 to unlock the override shaft 52 for rotation, and in which the drive gear 62 is at least partially engaged with the driven gear 36 a sufficient amount for the drive gear 62 to transfer rotational movement to the driven gear 36 without slipping between the gears 36, 62. That is, the position of FIG. 6C provides sufficient longitudinal overlap between the drive and driven gears 62, 36 that the gear teeth will not be able to slip past each other. The position of FIG. 6C may define a longitudinally upper end of an unlocked range of movement for the override shaft 52 and drive gear 62, permitting the drive gear 62 to drive the driven gear 36 with an associated rotation of rotor shaft 32.

Figure 6D:
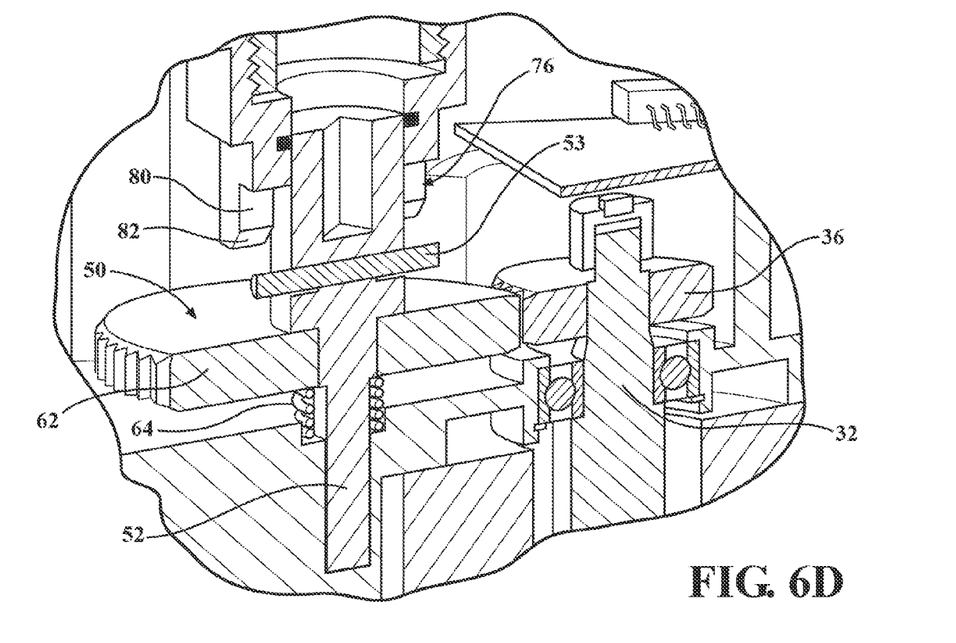

FIG. 6D illustrates the override shaft 52 in a fully depressed position, i.e., a fully longitudinally lowered position, in which the drive gear 62 is substantially fully engaged with the driven gear 36 along the longitudinal dimension of the gears 36, 62. The position of FIG. 6D may define a longitudinally lower end of the unlocked range of movement for the override shaft 52 and drive gear 62, within which the drive gear 62 may drive the driven gear 36 in rotation, as powered by the auxiliary drive unit 75.

Figure 7:
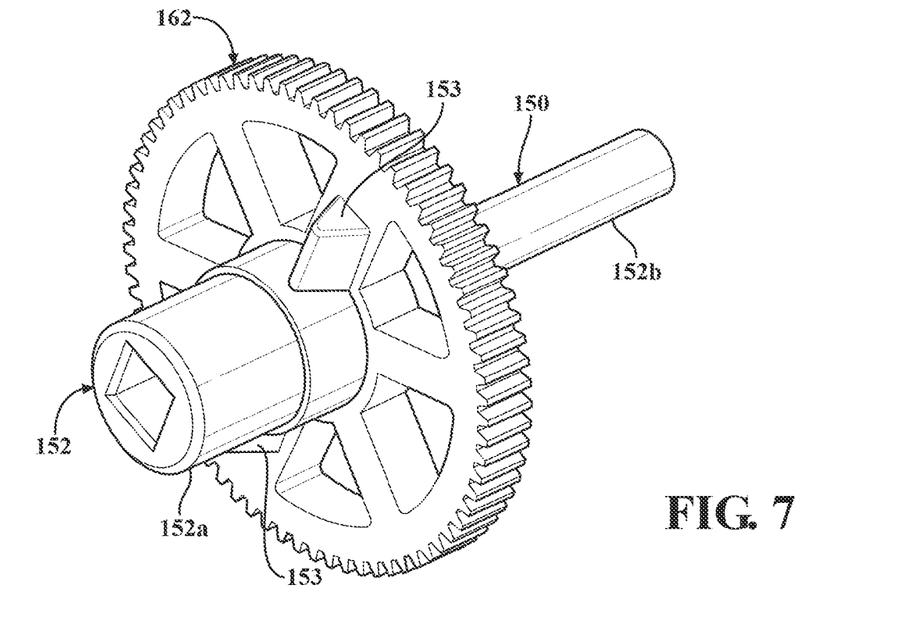
FIG. 7 is a perspective view of an alternative construction for an override shaft and drive gear.

Referring to FIG. 7, an alternative overdrive structure 150 is illustrated comprising an overdrive shaft 152 and drive gear 162. In accordance with an additional aspect of the invention, an upper shaft portion 152a is formed integrally with the drive gear 162, and a tine structure 153 is formed integrally with the upper shaft portion 152a and the drive gear 162. The tine structure 153 includes portions extending radially from diametrically opposing sides of the upper shaft portion 152a, and is formed with a configuration for engaging within the notches 80 of the castellated end 76 of the boss 56 (FIG. 4). For example, as illustrated in FIG. 7, the tine structure 153 may be formed with a narrowing taper in the longitudinal direction away from the drive gear 162, facilitating alignment upon engagement of the tine structure 153 with the notches 80. It may be understood that the tine structure 153 could comprise a single tine portion extending to one side of the upper shaft portion 152a for engaging a single notch 180 to prevent rotation of the override shaft 152. In addition, the override shaft 152 includes a lower shaft end 152b that can be press fit into the lower end of the upper shaft portion 152a in a telescoping engagement between the shaft ends 152a, 152b.

In an operation of the invention, the override structure 50 may be activated in the event of a failure of the motor 28 for the steering actuator 22. As an initial step, the plug 57 is removed from the cover 42 to provide access to the override shaft 52 of the override structure 50. The auxiliary drive unit 75 may be moved into position to engage the drive shaft 72 with the coupling structure 66 at the end of the override shaft 52. The auxiliary drive unit 75 may be used to apply an inward longitudinal force against the end of the override shaft 52, and overcome the biasing force of the spring 64 to move the drive gear 62 inward away from the cover 42. Within the locked range of longitudinal movement, between the longitudinal positions of the drive gear 62 illustrated in FIGS. 6A and 6B, the override shaft 52 is prevented from rotating, such that premature activation of the auxiliary drive unit 75 to provide a driving force to the drive shaft 72 will be resisted. Once the override shaft 62 is moved inward to the unlocked longitudinal position of FIG. 6C, the drive gear 62 is permitted to rotate in response to an actuating rotational force from the auxiliary drive unit 75. Further inward movement to the final position of FIG. 6D may be performed, while the drive gear 62 is free to rotate. Upon reaching a final predetermined position for the output of the steering actuator 22, the auxiliary drive unit 75 may be withdrawn to permit the override shaft 52 and drive gear 62 to return to the position of FIG. 6A.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A steering actuator including a housing and a motor located within the housing, the motor including a stator and a rotor rotatably supported within the stator, the steering actuator further comprising:
    a rotor shaft supporting the rotor and including opposing input and output ends extending from respective ends of the stator, the rotor shaft supported for rotation about a rotor axis defining a longitudinal direction of the steering actuator;
    a driven gear supported on the input end of the rotor shaft for rotation with the rotor shaft;
    an override structure supported for rotation within the housing, the override structure including an override shaft and a drive gear;
    the drive gear supported for rotation with the override shaft wherein the drive gear is longitudinally movable relative to the driven gear to engage and disengage the drive gear relative to the driven gear; and
    a coupling structure on an end of the override structure for engagement with an auxiliary driver located outside of the housing, the housing including a hole for receiving a portion of the auxiliary driver therethrough for providing a rotational driving force to the override structure and effecting rotation of the rotor shaft.

2. The steering actuator as in claim 1, wherein the override structure effects rotation of the rotor shaft in the absence of an electromotive force within the motor.

3. The steering actuator as in claim 2, wherein the output end of the rotor shaft includes an output gear engaged with a gearbox providing an output of the steering actuator, wherein the output of the steering actuator includes an output shaft of the gearbox that is rotatable a selected rotational amount.

4. The steering actuator as in claim 3, wherein the output shaft of the gearbox is operably coupled to a powered outboard drive of a marine vessel for controlling the direction of a propulsor of the powered outboard drive.

5. The steering actuator as in claim 1, wherein the drive gear is movable relative to the housing in the longitudinal direction to engage the driven gear.

6. The steering actuator as in claim 5, wherein the housing includes a cover including the hole for receiving the portion of an auxiliary driver, and the hole receiving an end of the override shaft.

7. The steering actuator as in claim 5, wherein the override shaft is laterally displaced from and extends parallel to the rotor shaft.

8. The steering actuator as in claim 1, wherein the drive gear is movable within a first, locked range of longitudinal movement and a second, unlocked range of longitudinal movement, and wherein:
    1) within the first, locked range of longitudinal movement, a rotational driving force from the auxiliary driver is resisted to prevent rotation of the override structure; and
    2) within the second, unlocked range of longitudinal movement, the override structure is rotatable in response to a rotational driving force from the auxiliary driver.

9. The steering actuator as in claim 8, including a locking structure having a stationary component and a rotatable component, the stationary component supported in stationary relation to the housing and defining one or more notches adjacent to the override shaft and facing longitudinally toward the drive gear, and the rotatable component comprising a tine structure affixed on the override structure for engagement with the one or more notches.

10. The steering actuator as in claim 9, wherein the first, locked range of longitudinal movement is defined during an engagement between the tine structure and the one or more notches, and the second, unlocked range of longitudinal movement is defined by the tine structure being longitudinally spaced from the one or more notches.

11. The steering actuator as in claim 10, wherein the drive gear is disengaged from the driven gear throughout at least a portion of the first, locked range of movement, and the drive gear is engaged with the driven gear throughout the second, unlocked range of movement.

12. The steering actuator as in claim 11, wherein the drive gear is engaged with the driven gear during at least a portion of the first, locked range of movement.

13. The steering actuator as in claim 1, including a resilient biasing member for effecting longitudinal movement of the drive gear toward a longitudinal position that is disengaged from the driven gear.

14. The steering actuator as in claim 13, wherein at least a part of the override structure is movable in the longitudinal direction to engage the drive gear with the driven gear in response to a force applied in the longitudinal direction to the coupling structure on the end of the override structure.

15. A steering actuator including a housing and a motor located within the housing, the motor including a stator and a rotor rotatably supported within the stator, the steering actuator further comprising:
   a rotor shaft supporting the rotor and including opposing input and output ends extending from respective ends of the stator, the rotor shaft supported for rotation about a rotor axis defining a longitudinal direction of the steering actuator;
   a driven gear supported on the input end of the rotor shaft for rotation with the rotor shaft;
   an override structure supported for rotation within the housing, the override structure including an override shaft and a drive gear;
   the drive gear supported for rotation with the override shaft wherein the drive gear is longitudinally movable relative to the driven gear to engage and disengage the drive gear relative to the driven gear;
   a coupling structure on an end of the override structure for engagement with an auxiliary driver located outside of the housing for providing a rotational driving force to the override structure and effecting rotation of the rotor shaft;
   a boss extending from an interior surface of the housing and surrounding the override shaft, and the boss having a castellated end distal from the interior surface and defining notches;
   a tine structure extending radially from the override shaft and longitudinally positioned for engagement with one or more of the notches in the castellated end; and
   the override shaft supported to the housing for movement in the longitudinal direction to position the tine structure in engagement with and in disengagement from the one or more notches.

16. The steering actuator as in claim 15, including a resilient biasing member effecting movement of the override shaft to engage the tine structure in the one or more notches.

17. The steering actuator as in claim 15, wherein the castellated end of the boss includes prongs defining the notches therebetween, and distal ends of the prongs including edges angled inward in the longitudinal direction into the notches.

18. The steering actuator as in claim 15, wherein a longitudinal position of the tine structure in disengagement from the one or more notches corresponds to a longitudinal position of the drive gear engaged with the driven gear.

19. The steering actuator as in claim 18, wherein a longitudinal position of the tine structure in engagement with the one or more notches corresponds to a longitudinal position of the drive gear disengaged from the driven gear.

20. The steering actuator as in claim 19, including a longitudinal transitional position of the tine structure wherein the tine structure is in engagement with the one or more notches and the drive gear is engaged with the driven gear.

21. The steering actuator as in claim 15, wherein the override structure is movable in the longitudinal direction to engage the drive gear with the driven gear in response to a force applied in the longitudinal direction to the coupling structure on the end of the override structure.

22. The steering actuator as in claim 15, wherein the housing includes a housing cover defining the interior surface, and the boss being supported on the housing cover.

* * * * *